United States Patent [19]
Plume

[11] 3,887,229
[45] June 3, 1975

[54] CONVERTIBLE SEAT

[75] Inventor: Robert W. Plume, Sterling Heights, Mich.

[73] Assignee: Travel Products, Inc., Washington, Mich.

[22] Filed: Feb. 11, 1974

[21] Appl. No.: 441,080

[52] U.S. Cl. .......................... 297/65; 5/12; 5/37 R; 5/47
[51] Int. Cl. ........................ B60n 1/10; A47c 13/00
[58] Field of Search .......... 297/64, 65, 319, 92; 5/9, 5/12, 37 R, 48, 38, 47, 41, 64; 296/65, 66

[56] References Cited
UNITED STATES PATENTS

| | | | |
|---|---|---|---|
| 2,655,197 | 10/1953 | Schofield | 297/64 |
| 3,107,363 | 10/1963 | Simmons | 5/48 X |
| 3,171,684 | 3/1965 | Carte | 297/65 |
| 3,634,893 | 1/1972 | Hern et al. | 5/47 |
| 3,657,747 | 4/1972 | Rogers, Jr. et al. | 5/37 R |

Primary Examiner—Casmir A. Nunberg
Attorney, Agent, or Firm—Reising, Ethington & Perry

[57] ABSTRACT

A convertible seat arrangement and mechanism, especially adapted for use in mobile homes or van type camper vehicles, are disclosed for converting between seat and bed orientation. A pair of seats are arranged in fore and aft alignment and, for the seat orientation, the seat backs are in an erect position while the seat bottoms are provided with a desired rake for seating comfort. Each may be converted to bed orientation in which the seat is pushed forwardly and the seat back is folded to a prone position. The seat back and seat bottom are mounted on a carrier which in turn is supported on the seat base by linkage which, during the forward motion elevates the rear of the seat bottom and eliminates the rake. The seat back is pivotably mounted on the carrier by a hinge pivot which is disposed below the support for the seat bottom cushion so that no mechanism protrudes into the cushion region when in the bed orientation. With this low hinge pivot, mechanism is provided to cause the cushion of the seat back to move toward the hinge pivot during the folding of the seat back toward the prone position whereby the cushions are brought together without a gap therebetween in the bed orientation. When both front and back seats are in the bed orientation the back of the front seat and the bottom of the back seat are closely adjacent and in alignment with each other so that a flat full sized bed is formed by the combination.

14 Claims, 9 Drawing Figures

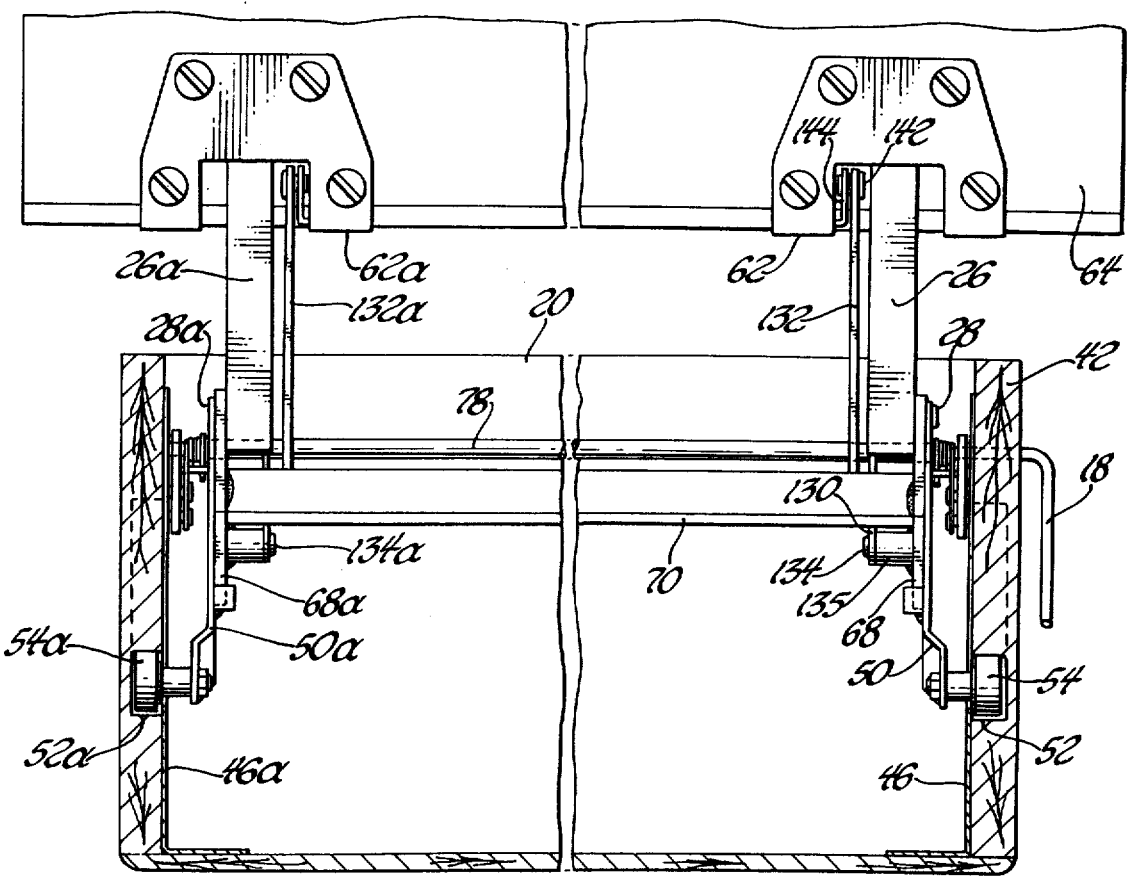
Fig. 6
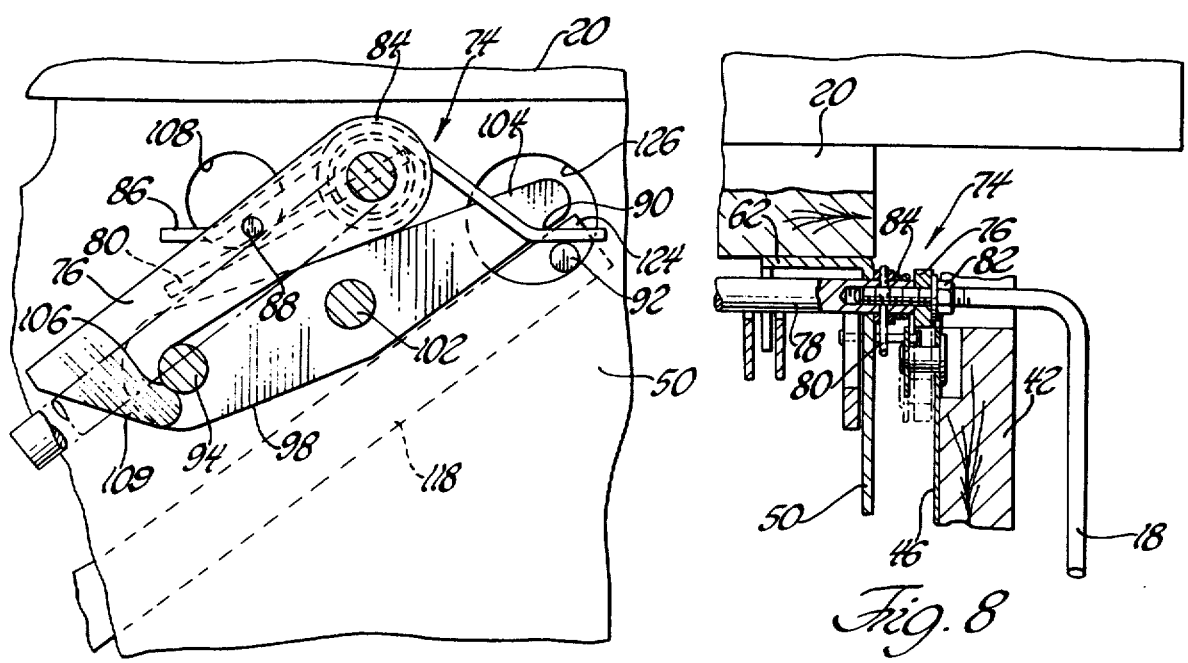
Fig. 7
Fig. 8

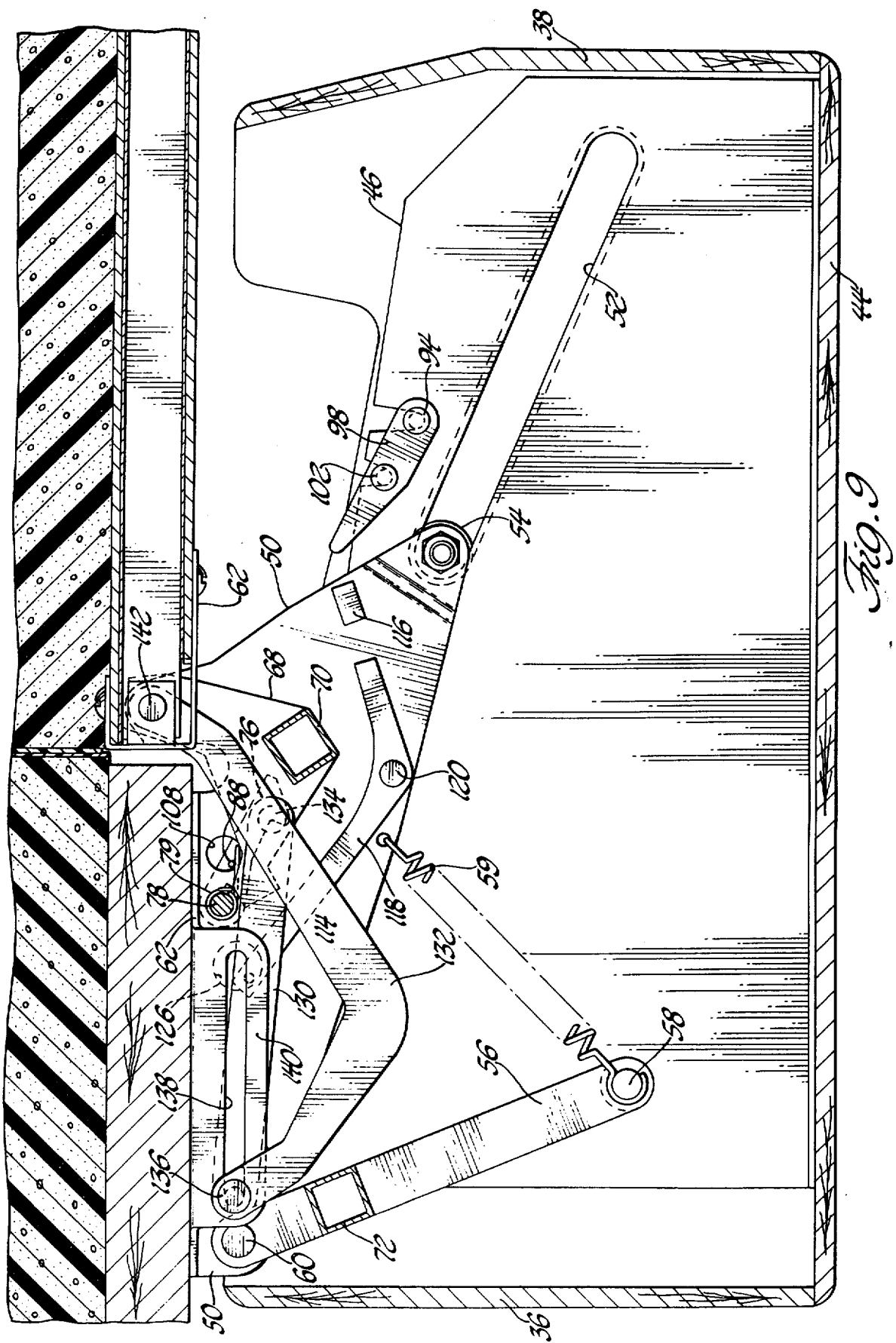

CONVERTIBLE SEAT

FIELD OF THE INVENTION

This invention relates to a seating apparatus which is convertible from a seat orientation into a bed orientation; more particularly the invention relates to a mechanism for vehicle seats which enables rearrangement of the seat bottom and seat back into a bed arrangement inside the vehicle.

BACKGROUND OF THE INVENTION

It is common practice in mobile homes or so-called camper vehicles because of space limitations, to utilize the same space for seating accommodation and for sleeping accommodation. This has been accomplished in various ways but the prior art leaves much to be desired, especially in respect to converting a seat into a bed and vice versa, and also in respect to the comfort afforded by the seat and the bed. It is desired, of course, to provide a vehicle seat which affords no less comfort and utility than it would if it were not convertible into a bed and to provide a bed which affords comfort and utility undiminished by the fact that it is convertible into a seat. At the same time it is desired that the conversion between bed and seat be effectuated by a simple operation, preferably by a simple manipulation requiring minimum manual effort.

In respect to effecting the conversion from seat to bed, the prior art discloses arrangements which, in general, require sequential manipulations and the manual handling of the seat bottoms and backs. A typical arrangement in a mobile home uses a pair of facing bench seats and for conversion to a bed the space between the seat bottoms is bridged by removing one of the seat backs from its normal location and positioning it between the seat bottoms. Such an arrangement is disclosed in the Mortrude U.S. Pat. No. 3,184,766. A similar arrangement is shown in the Koziol U.S. Pat. No. 3,598,981 wherein greater bed length is obtained by the additional step of moving the other seat back to a prone position adjacent one of the seat bottoms in the bed arrangement. It has also been proposed in the prior art to utilize a supporting mechanism for the seat bottom and seat back which enables the conversion between seat and bed configurations by coordinating seat bottom and seat back movement so that the conversion can be effected without dismantling the seat. Such an arrangement is disclosed in the Logan U.S. Pat. No. 3,282,625.

A principal difficulty in the prior art convertible seat mechanisms which control the seat back and seat bottom movements during conversion is that hinge pivots or other mechanisms protrude above the base of the seat cushion or mattress, or, alternatively, the mechanism leaves a gap between the seat cushions which, in the bed position, form a mattress. Hinge pivots, or other mechanisms protruding above the mattress base are, of course, a source of discomfort and, even worse, may result in serious injury. A convertible seat of the type having a high hinge pivot which protrudes above the mattress base is shown in the Schofield U.S. Pat. No. 2,655,197. A high hinge pivot point is also shown in the mechanism of the Carte U.S. Pat. No. 3,171,684. In some prior art mechanisms the problem of the high hinge pivot has been averted at the expense of having the seat cushions separated by a gap when the cushions are in the prone position for a bed. The use of a low hinge pivot is typified by the McKenna U.S. Pat. No. 1,668,167 which shows a fold mechanism which produces a wide gap between the cushions which is closed by the additional step of sliding the back cushion closer to the bottom cushion. A similar low hinge pivot mechanism is shown in the Zeller U.S. Pat. No. 1,981,212 wherein the cushion and frame are provided with a pin and socket arrangement so the cushions may be lifted and repositioned to close the gap.

Another principal difficulty in the prior art convertible seats is that the seat is uncomfortable due to the lack of seat bottom rake, i.e., downward slope to the rear of the seat bottom; alternatively, where prior art mechanisms have provided seat bottom rake, a flat bed is not provided and the bed is unsatisfactory. Some mechanisms have been proposed to overcome this disadvantage, such as that shown in the above-mentioned Carte U.S. Pat. No. 3,171,684. However, the linkage required in this prior art patent for eliminating the rake of the seat bottom when used as a bed also requires a high hinge pivot with the attendant disadvantage of leaving a gap between cushions. Seat bottom rake and a flat bed are also provided by the mechanism of the Schofield U.S. Pat. No. 2,655,197, also mentioned above, but at the expense of a high hinge pivot.

The convertible seats of the prior art generally represent a compromise so that the full potential comfort is not realized in either the bed or in the seat. Typically, the combination seats are constructed of tubular steel frame and foam cushions are attached thereto which, in the bed position, results in hard spots along the mattress. Furthermore, the prior art has generally failed to produce a bed unit with a satisfactory mattress size without an undesirably long seat bottom which is uncomfortable for persons with short legs. Additionally, the prior art mechanisms may be characterized as being difficult to operate and as having unreliable latching arrangements.

SUMMARY OF THE INVENTION

In accordance with this invention a convertible seat is provided which requires no mechanism above the mattress support when in the bed position; at the same time the invention provides for eliminating the gap between the seat cushions in the bed position without need for an extra step in converting from seat to bed. This is accomplished by utilizing a low hinge pivot together with linkage means which draws the cushions together as the seat back is pivoted to make a bed. Preferably the linkage is interposed between a portion of the seat back and the seat back cushion holder which is movably mounted on the seat back frame. Additionally, a counter-balance spring may be provided which is actuated simultaneously with the downward movement of the cushion holder on the frame.

Further, in accordance with the invention, the seat bottom is provided with the desired rake but the rake of the seat bottom is eliminated when used as a bed. This is accomplished by supporting the seat bottom through the intermediary of a carrier which is mounted on the seat base member by a travel or translation linkage adapted to change the seat bottom inclination with movement of the carrier. The travel linkage preferably comprises a ramp and ramp follower coupled with a pivot link supporting the carrier on the base member. The ramp and follower changes elevation of the rear of the seat bottom from a lower position when the travel linkage is rearmost to the same elevation as the front of the seat when the travel linkage is foremost, thus eliminating the rake for the bed position.

Additionally, in accordance with the invention, the seatbed conversion mechanism may be manipulated by one hand after operation of a single latch actuator. The ease of manipulation arises from sequential occurrence, in a seat to bed conversion, of rake elimination followed by combined folding and gap elimination. This is accomplished by releasing a travel latch by latch actuation in one direction, shoving the seat forward on its travel linkage which eliminates the rake, automatic engagement of the travel latch in the forward position, release of a fold latch by latch actuator rotation in the other direction and folding the seat back about its hinge pivot to the prone position which automatically draws the cushions together to close the gap.

The invention provides a convertible seat which lends itself to seat bottom dimensions affording maximum comfort and also lends itself to a full size or standard mattress when used as a bed. This is accomplished by the use of a pair of convertible seats disposed in fore and aft alignment with spacing between the base members so that the bottom of the back seat is adjacent the back of the front seat which is in a prone position when in the bed orientation. The mechanism of the invention lends itself to fabrication from heavy gauge sheet metal with both the seat bottom and seat back supported by the carrier on the seat base member and no external support is required, even in the bed position. Preferably, dual mechanisms are provided on each convertible seat at opposite sides thereof with synchronizing links or tie-bars therebetween. Further, the seat bottom and seat back cushions are provided with support members or holders which are preferably coextensive with the cushions and may take the form of plywood sheets which also serve as synchronizing links between the dual mechanisms.

A more complete understanding of this invention may be obtained from the detailed description that follows, taken with the accompanying drawings in which:

FIG. 6 is a view taken on lines 6—6 of FIG. 3;

FIG. 7 shows a detail of latch construction;

FIG. 8 is a view taken on lines 8—8 of FIG. 3; and

FIG. 9 is a side elevational view (from inside the seat) of the seat conversion mechanism in the bed orientation.

Figure 1:
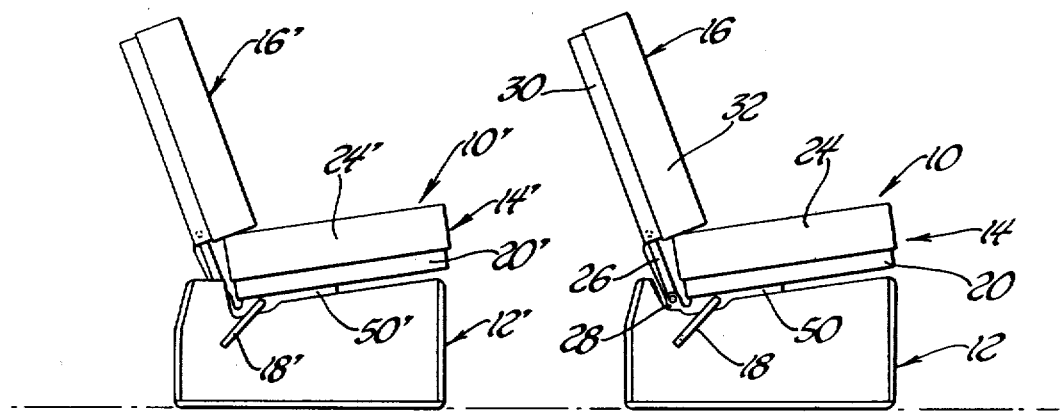
FIG. 1 shows a pair of convertible seats of this invention oriented in seat position.

Referring now to the drawings, there is shown an illustrative embodiment of the invention in a convertible seat especially adapted for use in a motor vehicle, such as a mobile home or a van type camper vehicle. It will be appreciated as the description proceeds that the invention is not limited to such applications but may be used wherever it is desired to provide a seat which is convertible to a bed.

As shown in FIG. 1, a pair of convertible seats 10 and 10', according to the invention, are arranged as front and rear seats in fore and aft alignment. In a van installation the convertible seats would be disposed rearwardly of the vehicle driver's seat and opposite the side doors of the van. The convertible seat 10 comprises, in general, a base member 12 which is suitably secured to the vehicle floorboard and which supports a seat bottom 14 and a seat back 16. A latch actuating handle 18 is accessible at the side of the seat for performing operations requisite to converting from a seat orientation to a bed orientation. It is noted that the seats, as shown in FIG. 1, are provided with a seat bottom rake, i.e., the seat bottom slopes downwardly to the rear with the desired degree of inclination to provide comfort. The convertible seat 10' is a duplicate of the seat 10 and corresponding parts are designated with the same reference character having a prime symbol added thereto.

Figure 2:
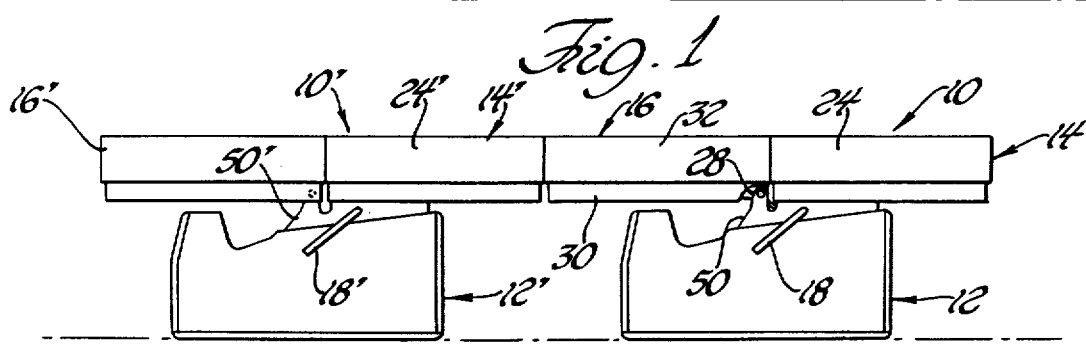
FIG. 2 shows a pair of convertible seats oriented in the bed position.

The convertible seats of FIG. 1, after conversion to a bed orientation, are illustrated in FIG. 2. It is noted that the seat bottoms 14 and 14' have been moved forwardly on the respective bases 12 and 12' and the rake of the seat bottoms is eliminated. Thus with the seat backs 16 and 16' folded to the prone position, a flat bed is provided, i.e., all of the sections are in a horizontal position.

Referring further to FIGS. 1 and 2, the seat bottom 14 comprises a cushion holder or seat bottom support member 20, which is mounted upon a carrier 50 which, in turn, is movably supported on the seat base member 12 in a manner to be described. A seat bottom cushion 24 is disposed on the seat bottom support member 20 and secured thereto in a suitable manner. The seat back 16 comprises a seat back support member including a frame member 26 pivotally mounted on the carrier 22 by a hinge pivot 28. The seat back support member additionally comprises a cushion holder 30 which is movable to and from the hinge pivot in a manner to be described later. A seat back cushion 32 is suitably secured to the cushion holder 30.

In the bed orientation, as shown in FIG. 2, it is noted that the hinge pivot 28 is disposed below the supporting surfaces for the cushions 24 and 32, which constitute part of the bed mattress. This obviates the problem of hard objects being disposed above the level of the mattress base which might cause discomfort or injury. Additionally, it is noted that the seat back cushion 32 in the prone position in the bed orientation is disposed in edge-to-edge engagement with the seat bottom cushion 24, i.e., there is no gap therebetween which would lend discomfort to the mattress. The closing of the gap between cushions 24 and 32, as noted in FIG. 2, is effected by sliding the cushion holder 30 toward the hinge pivot 28 which, as will appear hereinafter, is accomplished coincidentally with folding the seat back 16 to the prone position. Additionally, it is noted that in the bed orientation of FIG. 2 the seat back cushion 32 of the convertible seat 10 and the seat bottom cushion 24' of the convertible seat 10' are in edge-to-edge engagement to provide a continuous mattress surface for the bed. For this purpose the convertible seats 10 and 10' are spaced in the fore and aft direction so that corresponding points on the base members 12 and 12' are spaced a distance equal to the sum of the horizontal dimension of the seat bottom 24 in the prone position and the horizontal dimension of the seat back 16 in the prone position.

Figure 3:
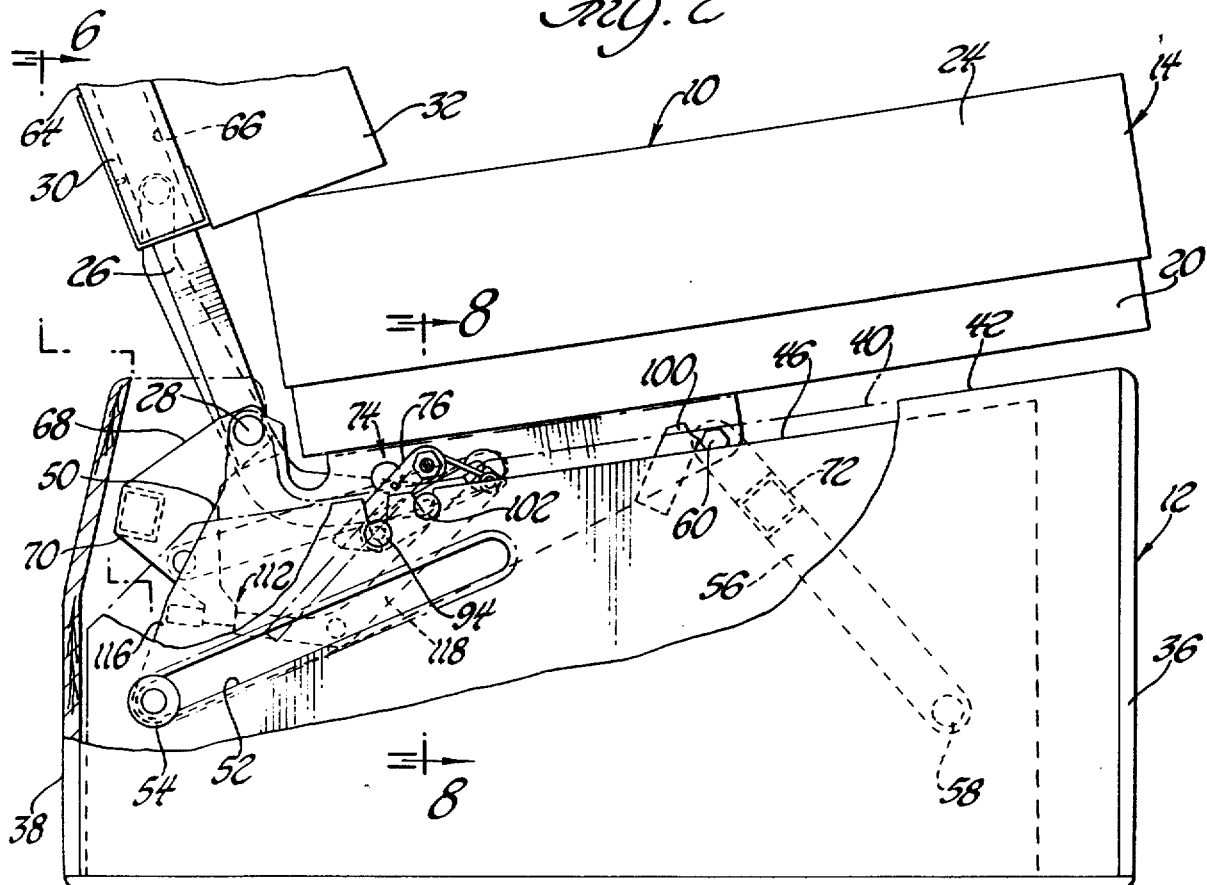
FIG. 3 is a side elevational view with parts cut away to reveal the seat conversion mechanism in the seat orientation.

Referring now to FIG. 3, the seat conversion mechanism is shown in detail with the seat 10 in the seat orientation. It is observed at this point that each of the convertible seats is provided with dual conversion mechanisms and, with the exception of the illustration of FIG. 6, only one such mechanism is shown in the drawings. The description will be given with respect to the mechanism disposed at the right-hand side of the convertible seat 10 and, with the exceptions noted herein, the mechanism at the left-hand side of the seat is a mirror image of the one to be described.

As shown in FIG. 3, the base member 12 is a box-like structure, suitably of wood and includes front and back walls 36 and 38, a left end wall 40, a right end wall 42 and a bottom plate 44. The base member also includes a right end plate 46 attached, suitably by screws, to the inner surface of the right side wall 42. The plate 46 is preferably constructed of sheet steel and is generally of rectangular configuraton. As noted above, the seat conversion mechanism which is about to be described including the end plate 46, is duplicated in mirror image at the left side of the seat. The description, however, will be given explicitly with reference to the conversion mechanism on the right-hand side of the seat and occasional reference will be made to the corresponding mechanism on the lefthand side.

Figure 5:
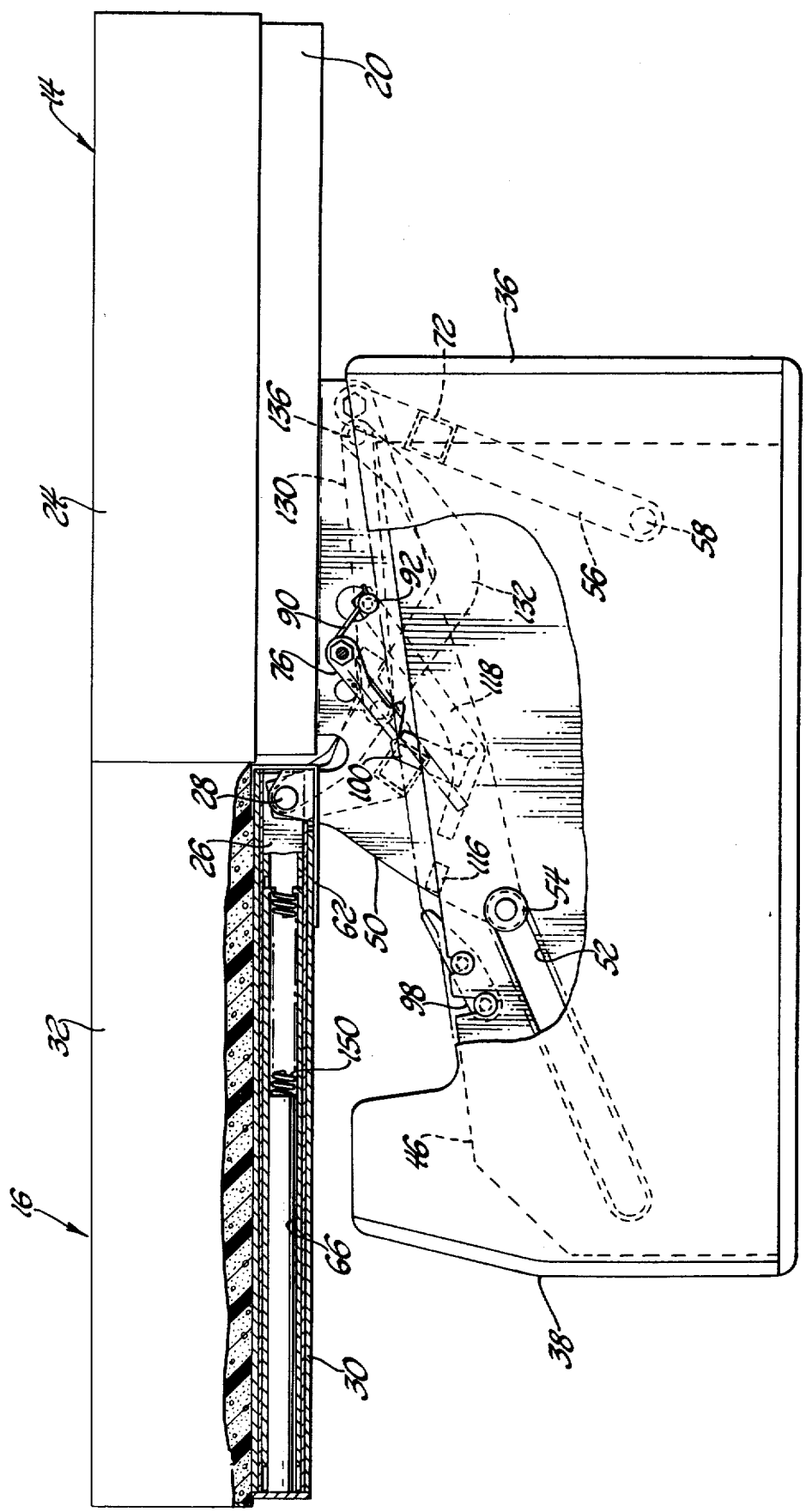
FIG. 5 is a side elevational view showing the seat conversion mechanism in the bed orientation.

According to this invention, the first step in effecting the conversion from the seat orientation to the bed orientation is that of moving the seat with its seat back erected, as illustrated in FIG. 3, to a forward position in which the rake of the seat bottom 14 is eliminated. This forward movement or travel of the seat assembly is accomplished by means of the carrier 50 which is movably mounted upon the base member 12 by a translation linkage. The carrier 50, as depicted in FIG. 3, comprises a somewhat triangular metal plate which has its left-hand lowermost corner supported by a ramp means which includes a ramp surface 52 formed in the end wall 42 as a track for a ramp follower or roller 54, which is rotatably mounted on the carrier 50. The roller 54 (see FIG. 6 also) is mounted by means of a stub shaft extending from the carrier 50 through a slot in the end plate 46 with the slot being narrower than the track 52 and thus forming a retaining guideway for the roller. The forward corner of the carrier 50 is supported on the end wall 42 by means of a pivot link 56 which is pivotally connected by a pivot pin 58 to the end wall and pivotally connected by a pin 60 to the carrier 50. A counterbalance tension spring 59 is connected between the pin 58 and the carrier 50 to aid movement of the carrier toward the no rake position (FIG. 9). The seat bottom support member 20, which is suitably of plywood construction, is secured to a horizontal flange 62 (see FIG. 8) and is thus movable with the carrier. The seat back 16 which has a support member including a frame member 26 is supported on the carrier 50 by a hinge pivot 28 at the upper corner of the carrier. The seat back support member also includes a cushion holder 30 which comprises a steel bracket 62 and a back plate 64, suitably of plywood, which is mounted in the bracket 62. The seat back cushion 32 is mounted on the forward surface of the back plate 64 in a suitable manner. As will be described subsequently, the cushion holder 30 is slidably or reciprocably mounted on the frame member 26 which as indicated in FIGS. 3 and 5 extends into a passage 66 in the back plate 64 in a manner to be described subsequently. Thus it can be seen that the seat back 16 and the seat bottom 14 are both mounted upon the carrier 50 for movement therewith relative to the base member 12.

Before proceeding with the description of the fore and aft travel of the carrier 50 and hence the seat bottom 14 and seat back 16, reference is made to FIG. 6 which depicts one view of the seat conversion mechanism on the right side, which is being discussed in detail, and also depicts the seat conversion mechanism on the left side, which is a mirror image of that being described in detail. For convenience, parts in the left-hand mechanism of FIG. 6 which correspond to those in the right hand mechanism are designated with the same reference character and the addition of the letter $a$. The right-hand and left-hand seat conversion mechanisms are operated in synchronism by reason of several cross-ties or links which are best shown in FIG. 6. First it is noted that the seat bottom support member 20 is supported by the right-hand carrier 50 and secured thereto by the horizontal flange 62 and it is also carried by the left-hand carrier 50a and secured thereto by the horizontal flange (not shown) of the carrier 50a. Additionally, the seat back 16 is supported by right-hand frame member 26, as described above, and is also supported by the left-hand frame member 26a in the same manner. Accordingly, the seat back 16 and the seat bottom 14, being supported by both the right-hand and left-hand mechanisms and being of rigid frame construction, serves to interconnect the dual mechanisms. To supplement this interconnection and to cause the dual mechanisms to move in unison or synchronism, a cross-link or bar 70 extends between the left and right-hand mechanisms and is secured at opposite ends to the seat back frame members 26 and 26a through the intermediary of respective crank members or plates 68 which serve additional functions to be described later. Similarly, a cross-link or bar 72 (see FIG. 3) extends between the right and left-hand mechanisms and is secured at its opposite ends to the pivot link 56 and the corresponding pivot link (not shown) of the left-hand mechanism. The cross-links or bars 70 and 72 are suitably rectangular steel tubing and are secured to the respective plates and the links by means of welding. As the description proceeds, it will be understood that movements of the right-hand mechanism will be accompanied by corresponding movements of the left-hand mechanism by reason of the cross-ties or links as just described.

With the convertible seat 10 in the seat orientation, as shown in FIGS. 1 and 3, the seat bottom 14 is positively latched in fore and aft position by a travel latch 74. The travel latch 74 is shown with the seat in the rear position in FIGS. 3, 7 and 8. The travel latch comprises a latch lever or pawl 76 which is pivotally mounted on the carrier 50 by a cross-rod or latch shaft 78. The latch pawl 76 is mounted upon the latch shaft by means of the latch handle 18 which is of L-shape and which has a threaded end screwed into a tapped bore in the end of the latch shaft 78. As shown in FIG. 8, the threaded end of the latch handle 18 passes through an opening in the latch pawl 76 and is held in position adjacent the end of the latch shaft by a nut and washer 82. The latch pawl 76 is rotatably mounted relative to the latch shaft 78 and the latch handle 18 and is spring biased in a counterclockwise direction by means of a helical spring 84 mounted on the latch shaft 78 and having one end 86 bearing upon the latch pawl 76 through the intermediary of a drive pin 88. The other end 90 of the spring 84 bears against another drive pin 92 which is part of another latch to be described subsequently. The travel latch pawl 76 is actuable in the clockwise direction by an actuator pin 80 which extends radially through the latch shaft 78 and through the inner end of the latch handle 18. The latch shaft 78 and hence the latch handle 18 are biased toward a neutral or latching position by a torsion spring 79 (see FIG. 9) disposed on the shaft 78. The spring 79 has one end anchored to the shaft 78 and the other end anchored to the carrier 50 by extending into an opening 126 in the carrier.

The travel latch 74 further comprises a rear striker 94 which is engageable by the pawl 76, as shown in FIG. 7, with the seat in the rear position. The rear striker 94, which takes the form of a headed pin, is mounted on the end plate 46. A stop plate 98 is mounted on the inner end of the striker 94 and on the inner end of a headed pin 102 which serves as a safety latch striker and extends also from the end plate 46. The stop plate has a nose portion 104 which is disposed adjacent the drive pin 92, for reasons which will appear later, when the seat is in the rear position as shown in FIG. 3. Referring again to the latch pawl 76, as shown in FIG. 7, it will be noted that the pawl is provided with a hook portion which is adapted to engage the striker 94 and thus the latch 74 prevents forward travel of the seat when the latch pawl is in the position shown. In order to release the travel latch 74 the latch handle 18 may be rotated in the clockwise direction (from the right-hand end of the seat) and the actuator pin 80 engages the drive pin 88 and rotates the latch pawl 76 in the clockwise direction to lift it from the rear striker 94. It is noted further in FIG. 7 that the drive pin 88 extends through an opening 108 in the carrier 50 so that the motion of the drive pin 88 is limited by the edges of the opening and hence the motion of the pawl 76 and the latch handle 18 is limited. Further, with reference to FIG. 7 it is noted that the latch pawl 76 is also provided with an inclined nose portion 109 which, in rearward movement of the seat, engages the pin 102 and the striker 94 successively and is cammed thereover against the bias of the spring 84. The travel latch also includes a forward striker 100 mounted on the end plate 46. The forward striker 100 is engaged by the pawl 76 with the seat bottom in the forward position, as will be described below.

Figure 4:
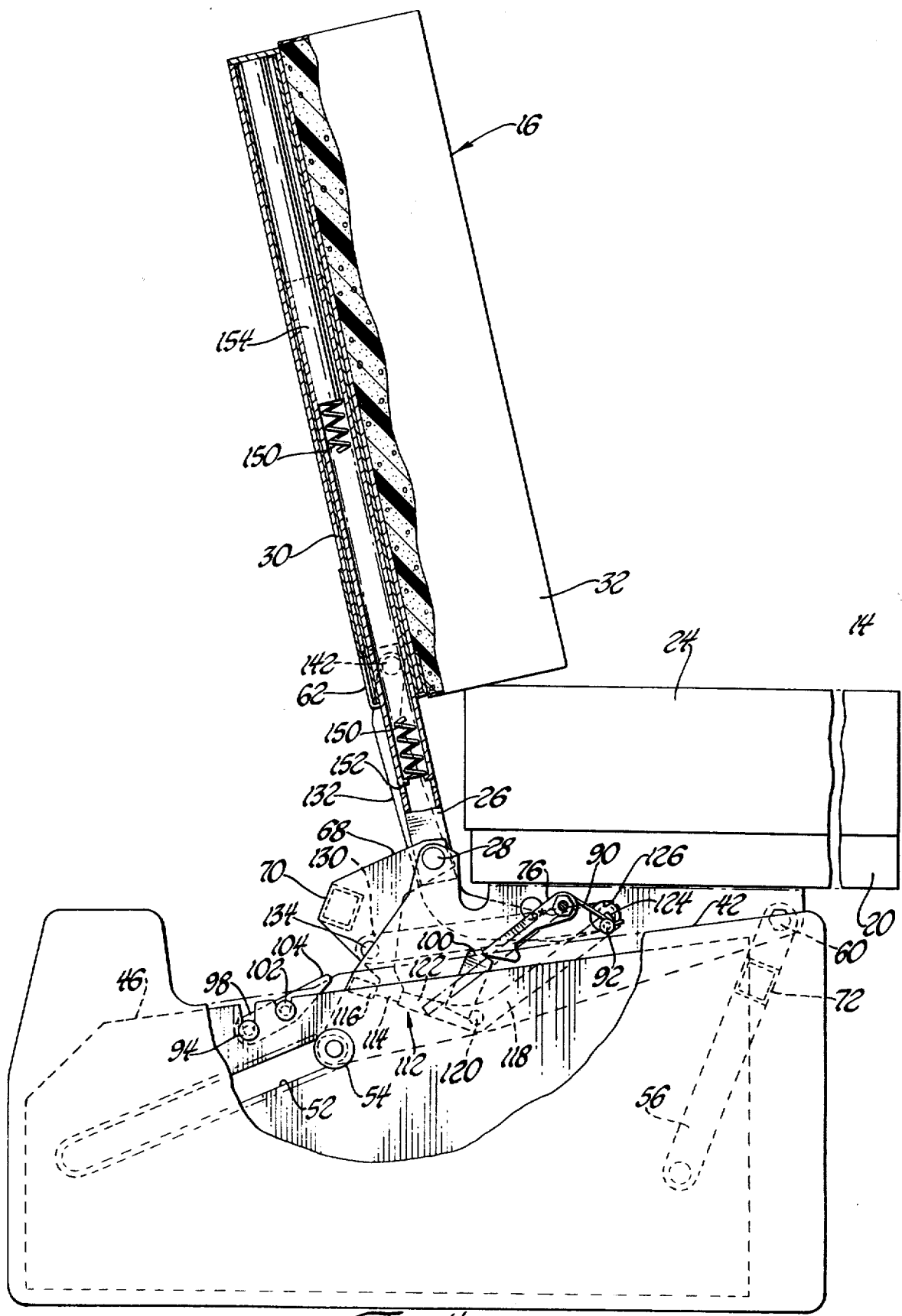
FIG. 4 is a side elevational view showing the seat conversion mechanism with the seat forward in an intermediate orientation between the seat and bed position.

The first step in effecting the seat-to-bed conversion will now be described in view of the description of the conversion mechanism thus far given. It will be recalled that the seat-to-bed conversion is a two step operation in which the first step includes forward travel of the seat to eliminate the seat bottom rake and to achieve a desired forward position of the seat bottom and seat back for use in the bed. In order to permit forward motion of the seat, the latch handle 18 must be rotated clockwise as viewed from the right-hand side of the seat in order to release the travel latch 74. With the latch in the released position, a manual force in the forward direction upon the seat back or seat bottom causes of carrier 50 to move forwardly. This forward motion of the carrier 50 is accommodated by the motion of the roller 54 along the ramp 52 and also by the forward pivotal motion of the pivot link 56 about its fixed pivot pin 58. Referring now to FIG. 4, the seat is shown in its forward position with the roller 54 at the upper end of the ramp 52 and with the pivot link 56 inclined forwardly. In this position the travel latch pawl 76 has its outer end in abutting engagement with the front striker 100 which holds the seat in the forward position. In this forward position the ramp means 52 and 54 and the pivot link 56 support the carrier 50 so that the seat bottom rake is eliminated and the cushion 24 is supported in a horizontal position.

With the convertible seat in the seat orientation as shown in FIG. 3 and also with the seat in the forward position as shown in FIG. 4 the seat back is held in the erect position by means of a fold latch 112. Referring now to FIG. 4, it will be recalled that the crank member or plate 68 is fixedly mounted with respect to the seat back frame member 26 and is pivotable therewith about the hinge pivot 28. The crank plate 68 is provided at its lower end with a latch element or tang 114 which, with the seat back in the erect position, abuts against a stop element 116 which is mounted on the carrier 50. A fold latch pawl 118 is pivotally mounted on a carrier 50 by a pin 120 and the pawl is generally of L-shape configuration. The lower end 122 of the pawl 118, when in the latching position, is in abutment with the latch tang 114. Thus, in the latching position of the pawl 118 the tang 114 is confined between the stop element 116 and the end 122 of the pawl. In this position the crank plate 68 and hence the seat back frame member 26 are prevented from pivotal motion about the hinge pivot 28. Referring again to the fold latch pawl 118 the upper end 124 carries a headed drive pin 92 which extends through an opening 126 in the carrier 50 and is biased downwardly by the end 90 of the helical spring 84. (Refer also to FIG. 7 which shows the upper end 124 of the pawl 118 with the drive pin 92 engaging the end 90 of the helical spring 84). The fold latch pawl 118 is releasable from the latch tang 114 by rotation in a counterclockwise direction as viewed in FIG. 4. For this purpose the actuator pin 80 which is carried by the latch shaft 78 operatively engages the drive pin 92 by counterclockwise rotation of the latch handle 18 and lifts the upper end of the pawl 118 against the bias of the spring 84. The edge of the opening 126 through which the drive pin passes serves to limit the rotation of the pawl 118. When the pawl 118 is rotated counterclockwise by the latch handle, the latch tang 114 on the crank plate 68 clears the lower end 122 of the latch pawl and the crank plate 68 and hence the seat back frame member 26 are free to rotate in a counterclockwise direction about the hinge pivot 28 and the seat back 16 may be folded to the horizontal or prone position.

When the seat back is folded to the prone position the seat back cushion holder 30 is drawn toward the hinge pivot 28 by linkage which will now be described. In order to impart motion to the cushion holder 30 in synchronism with the folding of the seat back 16 to the prone position and vice-versa, the crank plate 68 is connected by way of a push link 130 and a drag link 132 to the cushion holder 30 which is reciprocably movable on the seat back frame member 26. Considering this linkage in greater detail with reference to the right side elevation view of FIG. 4 and the side elevation view (from inside the seat) of FIG. 9, it is noted that the push link 130 is pivotally connected to the crank plate 68 by a pivot pin 134 extending through a base 135 (see FIG. 6) and is formed as a straight rigid link extending forwardly from the pin 134. The forward end of the push link 130 is pivotally connected to the forward end of the drag link 132 by pivot pin 136. As best shown in FIG. 9 the drag link 132 is of boomerang configuration for the purpose of providing proper clearance from other portions of the mechanism. The pivot pin 136, which connects together the forward ends of the push link 130 and drag link 132, extends through a guide slot 138 in a vertical flange 140 which extends downwardly from the horizontal flange 62 of the carrier 50. The upper end of the guide link 132 is pivotally connected to the cushion holder 30 by way of a pivot pin 142 and a flange 144 formed integrally with the support bracket 62. Thus, it can be seen with reference to FIGS. 5 and 9 that downward folding motion of the seat back 16 causes the crank plate 68 to thrust the push link 130 forward in the guide slots 138; this carries the drag link 132 forward therewith which in turn pulls the cushion holder 30 downwardly toward the hinge pivot 28 along the seat back frame member 26.

In order to provide a counterbalance force to aid in erecting the seat back 16 from its prone position to convert from bed to seat orientation, a counterbalance spring 150, suitably a helical compression spring, is disposed within the seat back frame member 26. It will be recalled that the frame member 26 is constructed of rectangular steel tube and, as shown in FIGS. 4 and 5, the lower end of the spring is seated on integral tangs 152 struck inwardly from the steel tube. A spacer rod 154 is disposed between the upper end of the spring 150 and the upper end of the cushion holder 30. As shown in FIG. 4, the counterbalance spring 150 is in its extended position with the seat back in its erect position. As shown in FIG. 5, with the seat back in the prone position after the downward folding, the counterbalance spring is in its compressed position. With the seat back in the prone position, rotation about the hinge pivot 28 is limited by the abutment of tang 114 (on crank plate 68) with the latch shaft 78. It can be seen, especially with reference to FIG. 5, that the seat back 16 may be moved to its erect position by lifting the left-hand or rear edge of the seat back and the upward force will be augmented by the counterbalance spring 150 which exerts a counterclockwise torque on the seat back through the linkage.

The operation of the convertible seat will be described briefly with reference to an installation of the type shown in FIGS. 1 and 2, as would be used in a camping van type vehicle. With the convertible seat in the seat orientation, as shown in FIGS. 1 and 3, the seat back 16 is in the erect position and the seat bottom 14 is provided with a suitable rake. To convert from the seat orientation to the bed orientation, the latch handle 18 is rotated clockwise to release the travel latch 74 by lifting the latch pawl 76 over the striker 94; with the latch pawl in the lifted position the seat bottom 14, which is mounted on the carrier 50, may be pushed forwardly which causes the carrier to travel on the ramp means including the roller 54 and the ramp track 52 and on the pivot link 56. The forward motion of the carrier continues until the roller 54 reaches the forward end of the ramp track 52 in which position the pivot link 56 is inclined forwardly and the rear of the seat bottom support means 20 is elevated to eliminate the rake of the seat bottom. In this forward position, as shown in FIG. 4, the travel latch pawl 76 has passed over the striker 100 and is disposed in abutting relation thereto, to block rearward motion of the carrier. In the forward position of the seat, as shown in FIG. 4, the fold latch including the latch pawl 118 may be released by counterclockwise rotation of the latch handle 18. It is to be noted that with the seat in the rearward position as shown in FIG. 3, that the fold latch cannot be released because counterclockwise rotation of the latch handle is blocked by the nose 104 of the stop plate 98 (see also FIG. 7). Referring again to the seat in the forward position as shown in FIG. 4, with the latch handle 18 rotated in the counterclockwise direction the fold latch pawl is rotated in the counterclockwise direction about its pivot pin 120 by the actuator pin 80 and the latch shaft 78. Accordingly, the end 122 of the pawl 118 clears the tang 114 on the crank plate 68 and the plate and the frame member 26 are free to rotate in the counterclockwise direction. During such rotation toward the prone position the push link 130, actuated by the crank plate 68 carries the forward end of the drag link 132 along the guide slot 138 which pulls the upper end of the drag link and hence the cushion holder 30 downwardly toward the hinge pivot 28. This downward motion of the cushion holder 30 compresses the counterbalance spring 150 as the seat back 116 is brought to the prone position as shown in FIGS. 9 and 11 in horizontal alignment with the seat bottom 14. Thus the convertible seat 10 is disposed in the bed orientation and as shown in FIG. 2, the convertible seat 10' is converted to the same bed orientation so that the combination makes a full size bed. When the seat orientation is desired again the process as just described is reversed, i.e., the seat back is lifted with the aid of the counterbalance spring to the erect position and when the tang 112 on the crank plate 68 reaches the stop 116 the rear end of the fold latch pawl will be spring biased into latching position to hold the seat back in the erect position. The final step to obtain the seat orientation is that of releasing the travel latch by clockwise rotation of the latch handle 18 and pushing the seat rearwardly until the travel latch pawl 76 cams over the striker 94 and is spring biased in engagement therewith to restrain forward movement of the seat.

Although the description of this invention has been given with respect to a particular embodiment it is not to be construed in a limiting sense. Many variations and modifications will now occur to those skilled in the art. For a definition of the invention reference is made to the appended claims.

The embodiments of the invention in which an exclusive property or privilege is claimed are defined as follows:

1. A convertible seat comprising a base member, a seat bottom support member mounted on the base member, a seat bottom cushion holder mounted on the seat bottom support member and adapted to receive a seat cushion, a seat back support member, a seat back cushion holder mounted on the seat back support member and adapted to receive a seat back cushion, said seat back support member being mounted on the seat base member for pivotal motion in the fore and aft direction relative to the seat bottom support member by a pivot element disposed below the level of the upper surface of the seat bottom cushion, one of said cushion holders being movably mounted on the respective said support member for movement toward and away from said pivot element, said seat back support member being disposed in an erect position to make a seat and being pivotally movable in the aft direction to a prone position to make a bed, and means connected with said one of the said holders for moving it relative to its support member toward the pivot element when the seat back support member is pivoted downwardly to convert the seat to a bed whereby said cushions on said holders may be positioned edge to edge without a gap therebetween in the bed.

2. The invention as defined in claim 1 wherein said means is connected with the seat back cushion holder.

3. The invention as defined in claim 1 wherein said means comprises a crank member connected with the seat back support member for a movement therewith and linkage means connected between said crank member and the seat back cushion holder.

4. The invention as defined in claim 3 wherein said crank member is a plate rigidly mounted on the seat back support member and said linkage means comprises a push link and a drag link being pivotally connected with each other with the push link pivotally connected to the plate and the drag link pivotally connected to the seat back cushion holder.

5. The invention as defined in claim 4 including stop means to limit the forward pivotal motion of the seat back support member and to retain it in the erect position for making a seat.

6. The invention as defined in claim 4 including stop means on the base member disposed in the path of movement of said crank member to limit the forward rotation of the seat back support member and a latch lever movable into the path of movement of the crank member to retain the seat back support member in the erect position for making a seat.

7. The invention as defined in claim 3 including a counterbalance spring operatively connected with said linkage means and urging said seat back support member toward its erect position when it is in its prone position.

8. The invention as defined in claim 7 wherein said seat back support member comprises a frame including a tubular element extending substantially normal to the direction of the axis of said pivotal motion, a compression spring disposed inside said tubular element and engaging abutment means thereon at one end and operatively connected with said linkage means at the other end.

9. A convertible seat comprising a base member, a seat support member, a seat back support member pivotally connected with the seat bottom support member and being pivotally movable between an erect position to make a seat and a prone position to make a bed, a ramp means and a ramp follower means in engagement and being relatively movable in the fore and aft direction of the seat, said ramp means being connected with said base member and said ramp follower means being connected with the seat bottom support member, a pivot link being pivotable in said fore and aft direction and having one end pivotally connected with said base member and having the other end pivotally connected with the seat bottom support member, said seat bottom support member forming part of the seat and having a rake when it is positioned in the fore and aft direction with said ramp follower means near the rearward end of the ramp means, said seat bottom support member forming part of a bed and having no rake when it is positioned in said fore and aft direction with said ramp follower means near the forward end of the ramp means, a latch element fixedly mounted on the base member, a latch arm pivotally mounted on the seat bottom support member and having a hook portion adapted to engage the latch element when the seat bottom support member is in the rearward position, and an abutment fixedly mounted on the base member, said latch arm being adapted to engage the abutment and hold the seat bottom support member in its forward position.

10. In a convertible seat of the type comprising a base member, a seat bottom support member, a seat back support member having a pivotal connection with the seat bottom support member, said seat bottom support member being movably mounted on said base member by a translation linkage for fore and aft movement, said seat bottom support member being movable to a rearward position to make a seat and being movable to a forward position to make a bed, said translation linkage including means for tilting the seat bottom support member to provide a rake in the rearward position and to tilt the seat bottom support member to eliminate said rake in the forward position, said seat back support member being disposed in an upper position to make a seat and being pivotally movable in the aft direction to make a bed, the improvement comprising means operatively connected with the seat back for drawing said seat back and said seat bottom together when the seat back is pivoted in the aft direction to make a bed, said pivotal connection including pivot means located below the upper surface of the seat bottom.

11. A pair of convertible seats as defined in claim 10, said convertible seats being disposed in fore and aft alignment with spacing between corresponding points on the base members equal to the sum of the fore and aft dimension of the seat bottom of the back seat and the fore and aft dimension of the seat back of the front seat when both convertible seats are made into a bed.

12. The invention as defined in claim 10 including travel latch means operatively connected between the base member and the seat bottom for latching the seat bottom selectively in its aft position and in its forward position, and fold latch means operatively connected between the seat back and the seat bottom for latching the seat back in its erect position.

13. The invention as defined in claim 12 wherein said travel latch means includes a rear latch element and a forward latch element on the base member, a latch lever pivotally mounted on the seat bottom, bias means urging said latch lever into engagement with the rear latch element and the forward latch element when the seat is in the aft and forward positions respectively, said fold latch means including a fold latch lever pivotally mounted on said seat bottom, second bias means urging said fold latch lever into the path of the portion of said seat back when said seat back is in its erect position, and a latch operating member operatively connected with said travel latch lever to oppose said first bias means on rotation of the member in one direction and operatively connected with said fold latch lever to oppose said second bias means upon rotation of said operating member in the other direction.

14. The invention as defined in claim 13 including an additional stop element on the base member in the path of movement of said latch operating member in said other direction to prevent operation of the fold latch lever and unlatching of the seat back when the seat bottom is in its aft position.

* * * * *